Oct. 4, 1949.     C. BERKLEY     2,483,452
COLOR SORTING DEVICE USING DIFFERENTLY COLOR-SELECTIVE
PHOTOCELLS AND A CATHODE-RAY TUBE
Filed Nov. 19, 1946     3 Sheets-Sheet 1
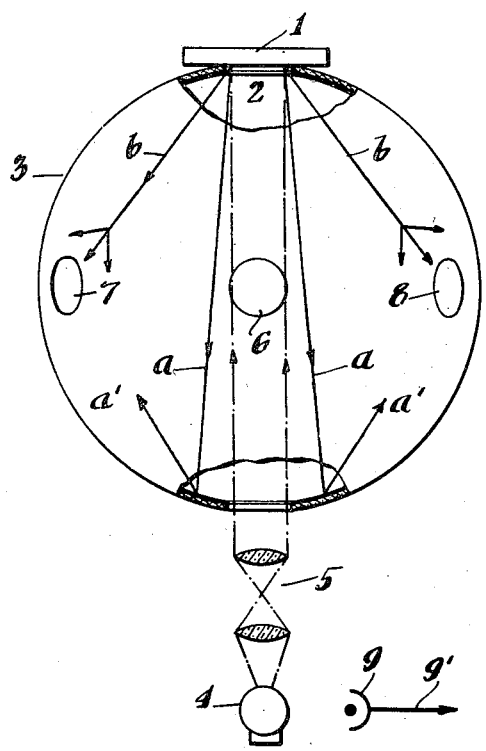
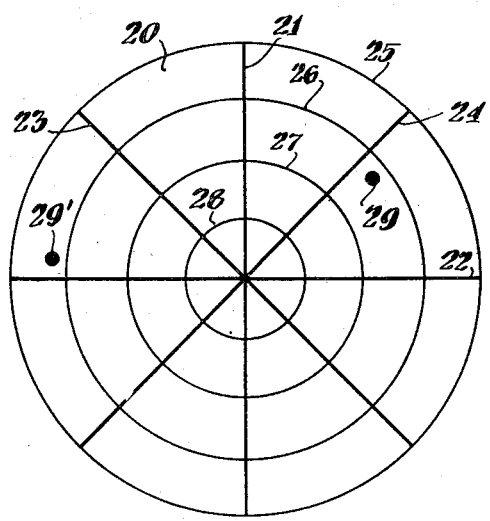
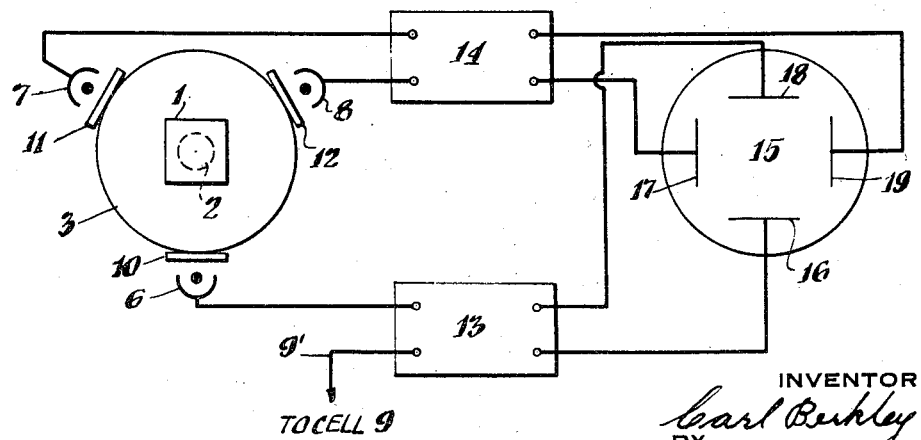
INVENTOR
Carl Berkley
BY
Charles W. Mortimer
ATTORNEY Oct. 4, 1949.  C. BERKLEY  2,483,452
COLOR SORTING DEVICE USING DIFFERENTLY COLOR-SELECTIVE
PHOTOCELLS AND A CATHODE-RAY TUBE
Filed Nov. 19, 1946  3 Sheets-Sheet 2

INVENTOR
Carl Berkley
BY
Charles W. Mortimer
ATTORNEY

Oct. 4, 1949.   C. BERKLEY   2,483,452
COLOR SORTING DEVICE USING DIFFERENTLY COLOR-SELECTIVE
PHOTOCELLS AND A CATHODE-RAY TUBE
Filed Nov. 19, 1946   3 Sheets-Sheet 3
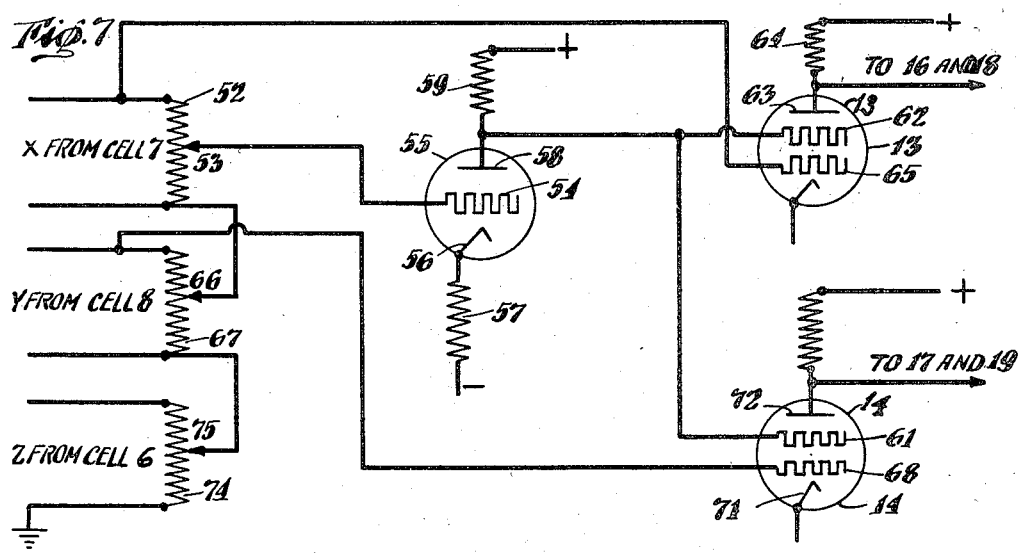
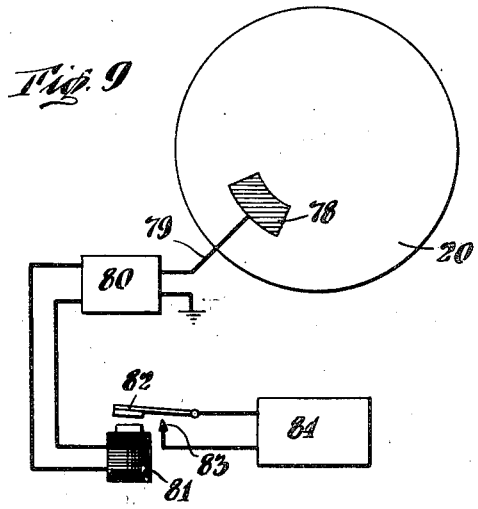
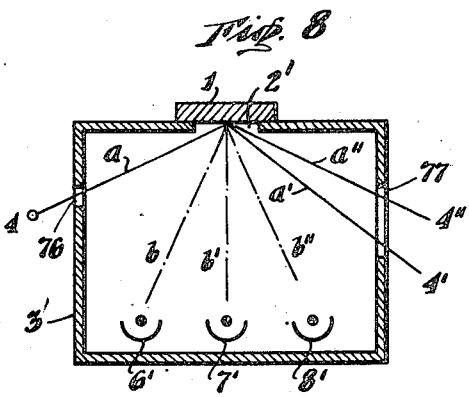
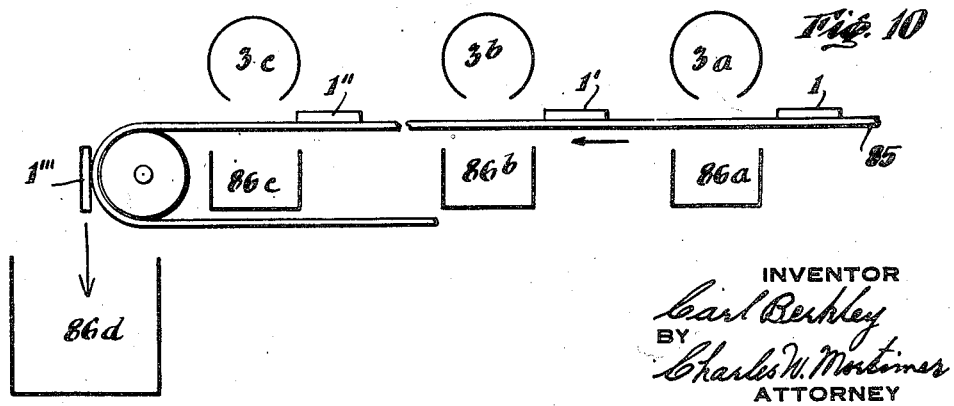
INVENTOR
Carl Berkley
BY
Charles W. Mortimer
ATTORNEY Patented Oct. 4, 1949

2,483,452

UNITED STATES PATENT OFFICE 2,483,452

COLOR SORTING DEVICE USING DIFFERENTLY COLOR-SELECTIVE PHOTOCELLS AND A CATHODE-RAY TUBE

Carl Berkley, New York, N. Y., assignor to Allen B. Du Mont Laboratories, Inc., Passaic, N. J., a corporation of Delaware Application November 19, 1946, Serial No. 710,851

3 Claims. (Cl. 88—14)

This invention relates to improvements in color sorting devices in which the color of an object is indicated practically instantaneously by the position of a fluorescent spot on the face of a cathode-ray tube in conjunction with which a special indicating device may be used.

One of the objects of this invention is to provide means for indicating the color of an object. Another object is to indicate simultaneously the brightness of the object. Another object is to provide adjustable means for automatically rejecting or accepting a large number of "shades" of a particular color.

A major problem in color measurements is to provide a method of indicating the hue (brightness or shade) and the saturation (purity) of a color the dominant wave length of which may not be known. A single reading should, if possible, give the color and saturation. It has been proposed to do this in accordance with the specifications of the International Commission on Illumination by giving the Y value as visual brightness and letting the position on a special scale represent purity and dominant wave length. A number of other methods of representing color have also been proposed, all of which may be carried out with the present invention.

In many industries it is necessary to sort finished products according to color. This is particularly true of the manufacture of colored glazed tile. While the invention will be described particularly as a device for sorting colored glazed tile as to color, it will be evident to those skilled in the art that it can be applied to any problem of color measurement, whether for opaque, translucent, or transparent objects.

The tiles to be sorted are such as are made in a batch process, and although an attempt is made to make them all of the same color and shade, variations in processing occur which give rise to different colors and shades. With this invention the tiles are sorted in such a manner that they are separated into harmonious groups such that when placed on a wall, they will give the impression of a single even color. It is not desired to reject any tile unless it has gross defects in color. This is likely only when impurities exist in or spots appear on the tile.

It has been customary to sort tiles by hand, the operator comparing each tile with a series of standards to produce several lots from each batch. This has resulted in considerable non-uniformity in the results due to the subjective methods used. While a number of color matching devices exist, they cannot be operated with sufficient speed to render their use economical. When the present invention is used, every tile of each lot matches every other tile in the same lot within very close tolerances. The match is close enough so that when the tiles are side by side, the average person can see no difference. With the present invention this sorting is accomplished automatically, when desired.

In carrying out this invention photocells and filters are used to produce signals and a cathode-ray tube is used as an indicating device for these signals. Light from the object being examined is applied to three photocells. The conditions of illumination of the object are so chosen as to avoid spurious responses such as those caused by unwanted specular reflection or by other stray light, or by variations in the measuring equipment.

The invention may be understood from the description in connection with the accompanying drawings in which:

Fig. 1 is a diagram of an illuminating system showing an embodiment of the invention in which an integrating sphere is used.

Fig. 2 is a simplified diagram showing somewhat diagrammatically the connections of the photocell outputs to deflection amplifier circuits to obtain deflection of the cathode-ray tube beam in a manner that may be calibrated with a scale of the type shown in Fig. 3.

Fig. 3 is a representation of one form of scale that may be applied to the screen of the cathode-ray tube of the invention.

Figure 6:
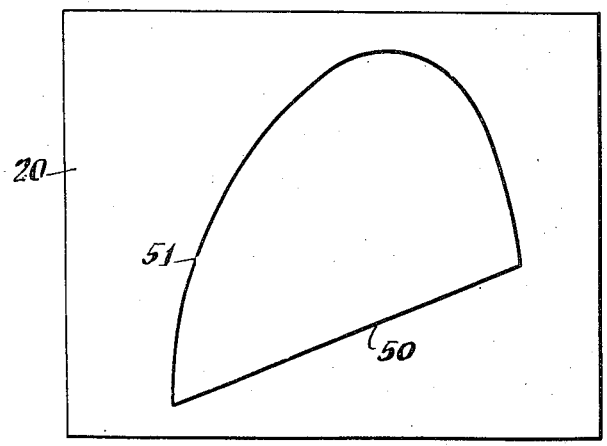

Fig. 6 is a graphical representation of the I. C. I. scale for color measurement.

Fig. 7 is a diagram of the electrical circuits used with an embodiment of the invention.

Fig. 8 is a diagram of another type of illuminating system that may be used with this invention.

Fig. 9 is a diagram of an automatic sorting device for the objects of different color, and Fig. 10 is a diagram of another automatic sorting device for the objects.

In the drawings reference character 1 represents a tile that is to be tested resting on the opening 2 in an integrating or Ulbricht sphere 3 that is supplied with light from a source 4, that may be an incandescent lamp, through an optical system 5. The light from the source 4 falls upon the tile 1. Rays reflected from the surface of the tile 1 may take such paths as $a$ or $b$, for example. The rays $a$ are those that are reflected from the glazed surface of the tile and return approximately along their original paths. The rays $b$ penetrate the tile and are then diffused against the inner surfaces of the sphere 3 from which they are reflected to the various photocells 6, 7 and 8 (Figs. 1 and 2).

Photocell 6 (Fig. 2) obtains light through a filter 10 of such a character that the photocell 6 has a color sensitivity characteristic approximately that of the human eye. Photocell 9 is placed in position to pick up light directly from the light source 4. The output from the photocell 6 is applied to one input of amplifier 13 the outputs of which are applied to the vertical deflection plates 16 and 18 of the cathode-ray tube 15 as indicated in Fig. 2.

Photocell 7 obtains its light through filter 11 of a type that passes only a narrow band of light at the red end of the visible spectrum. Similarly photocell 8 obtains its light through filter 12 of a type that passes only a narrow band of light at the blue end of the visible spectrum.

The outputs of photocells 7 and 8 are applied to the inputs of amplifier 14. The outputs of this amplifier 14 are applied to the horizontal deflecting plates 17 and 19 of the cathode-ray tube 15.

The screen 20 of the cathode-ray tube 15 is inscribed with the pattern or scale shown in Fig. 3 or a separate transparent mask is so inscribed and placed over the screen 20. Lines 21 and 22 are reference lines to indicate, respectively, horizontal and vertical displacement from the center. Lines 23 and 24 are reference lines to indicate equal horizontal and vertical displacement, and the concentric circles 25, 26, 27 and 28 are reference lines to indicate the extent of such displacements. The dots 29 and 29' illustrate positions that the cathode-ray spot may assume in accordance with two different colors.

Figure 4:
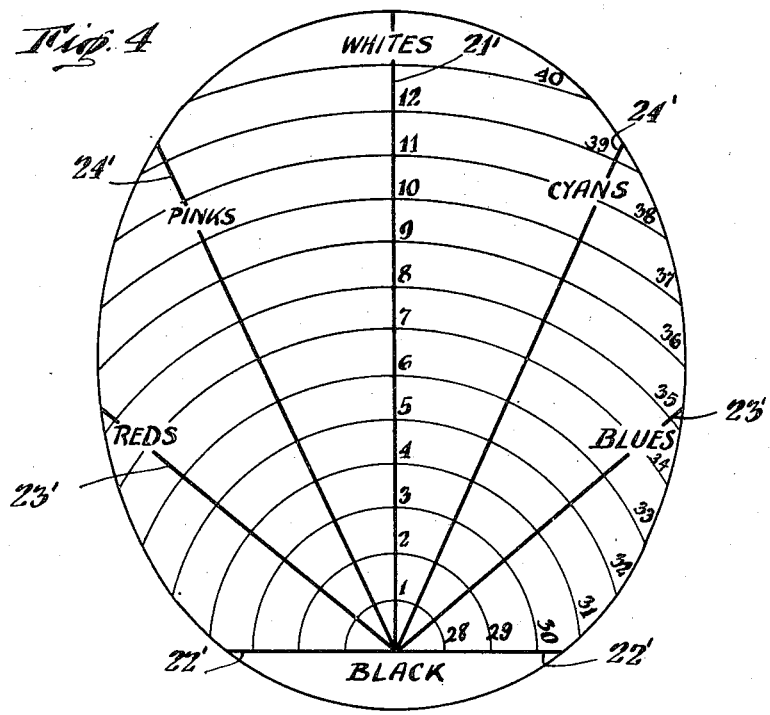
Fig. 4 is a representation of another form of scale that may be applied to the screen of the cathode-ray tube of the invention.

A modified form of the scale for the cathode-ray tube 15 is shown in Fig. 4, in which line 21' is the reference line for horizontal deviation and line 22' is the reference line at right angles to line 21 for vertical deviation as before. Lines 23', 23', 24' and 24' are intermediate reference lines. The curved lines 30 to 40 represent the magnitude of deflection.

Figure 5:
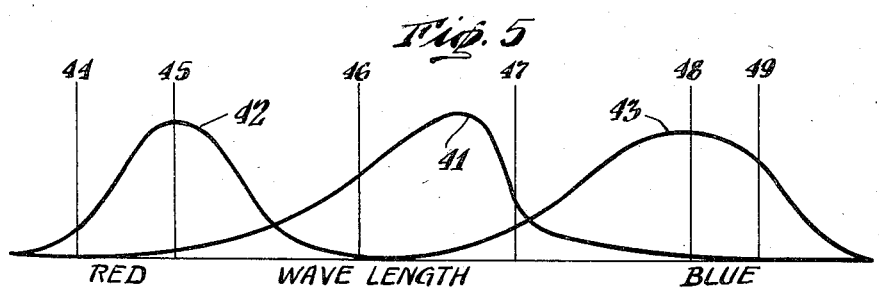
Fig. 5 is a graphical representation of a convenient color response characteristic of the photocells and filters.

The curve 41 of Fig. 5 is a graphical representation of the relative brightness of the light of various wavelengths diffused by a specimen of a single pigment. That of a two pigment specimen is shown by line 42. The responses of the photocell 7 that may be selected are shown by lines 44, 45 and 46, and those of the photocell 8 by lines 47, 48 and 49.

Another sort of scale is shown in Fig. 6. It is based on the trichromatic coefficients of the International Commission on Illumination. Such a pattern may be applied to the screen 20 of the cathode-ray tube 15. All the colors within the range of the photoelectric cells and filters are represented by points within the area bounded by the curved line 51 and the diagonal line 50.

The diagram of Fig. 2 shows the connections between the output of the photocells 6, 7, 8 and 9 and the deflection plates 16, 17, 18 and 19 of the cathode-ray tube 15, to obtain deflections that may be represented on such a scale as that shown in Fig. 3.

Fig. 7 shows diagrammatically the circuit for using photocells 6, 7 and 8 in connection with the scale of Fig. 6 to represent ICI coordinates. The output from photocell 7 is connected across the potentiometer 52 (Fig. 7). The movable contact 53 on this potentiometer is connected to the grid 54 of the vacuum tube 55. The cathode 56 of this tube is connected through resistor 57 to a source of low fixed potential. The plate 58 is connected to a source of higher positive potential through a resistor 59, and to a grid 62 of the tube 13 and to a grid 61 of the tube 14 which connections are also shown diagrammatically in Fig. 2. The grid 65 of tube 13 is connected to the high end of the potentiometer 52. The plate 63 of this tube is connected to a source of positive potential through a resistor 64.

The low end of the potentiometer 52 is connected to the variable tap 66 on the potentiometer 67 which is connected across the output of the photocell 8. The high end of this potentiometer 67 is connected to a grid 68 of the tube 14. The output of the vacuum tube 13 is applied to the vertical deflection plates 16 and 18 of the cathode-ray tube 15 and that of tube 14 to the horizontal deflection plates 17 and 19 of the cathode-ray tube 15 to deflect the cathode-ray beam to some point within the area determined by the lines 50 and 51 of Fig. 6, for the reasons and in the manner to be described later.

The signal appearing at the plate 58 of tube 55 (Fig. 7) is dependent on the sum of the signals from the three cells 6, 7 and 8. This signal is applied to control the outputs of tubes 13 and 14 as indicated in Fig. 7. The signals which appear at the grids 62 and 61 of tubes 13 and 14 therefore depend on the sum of the signals X, Y and Z from the photocells. This sum is used to reduce the gain of tube 13 for the X signal, obtained from potentiometer 52 and is applied as shown to grid 61 to reduce the gain of tube 14 for the Y signal, obtained from potentiometer 66 and applied as shown to grid 68. This is essentially a division process. The result is that the output of each of these tubes 13 and 14 depends on the values of $$\frac{X}{X+Y+Z}$$

and $$\frac{Y}{X+Y+Z}$$

which correspond exactly to the trichromatic coefficients of the I. C. I. system.

Another means of lighting the sample and measuring the light from it is shown in Fig. 8. The object 1 to be tested is placed over the opening 2' in the box 3' having two other openings 76 and 77. Light from the source 4 passes through opening 76 along the path $a$ to strike the sample 1. The specularly reflected light passes out along the paths $a'$ and $a''$ through the opening 77. The diffused light follows paths such as $b$, $b'$, $b''$, to impinge in part on the photocells 6', 7' and 8'.

Schematic arrangements are shown in Figs. 9 and 10 for adapting the invention to automatic operation. Reference character 78 represents an area of conductive material either on the inside or outside of the tube. A conductor 79 or other pickup device conveys the signal from area 78 to amplifier 80 having the coil 81 of a relay connected across its output. The contacts 82 and 83 of this relay actuate a device 84 of the known sort that causes the tile under test to be moved into its proper bin or chute when the cathode beam falls on the spot 78.

The conductive material 78 may be replaced by an area of transparent paint acting as a filter for certain colors or an area covered by a filter, or a hole in a mask covering the entire screen.

Different areas may be colored with different shades of light transmitting paint in such a way that when the spot is in a particular area of the tube face such as 78 of Fig. 9, a single photocell viewing the tube face is illuminated with a unique value of light intensity and the signal therefrom is amplified by the amplifier 80 and actuates the relay coil 81, to close the contacts 82 and 83 and cause a device 84 of the known sort to operate to move the tile into the appropriate chute or bin, shown in Fig. 10 as 86a, 86b, 86c and 86d.

The area 78 may be an electrode placed over the face 20 of the cathode-ray tube 15. Its signal is carried by an output lead 79 to the amplifier 80 to actuate the relay 81, 82, 83 and sorting device 84 as described above. The grid of the cathode-ray tube 15 is modulated at an appropriate frequency. When the spot is under a particular area a strong signal is developed due to space charge effects, while relatively little or no signal is obtained from neighboring targets or leads. The sorting device relay 81 reacts to a certain signal strength at the grid modulation frequency. The opposite effect may be obtained by coating the screen with a conductive material except in that area corresponding to the desired color tolerance. In such case the device is actuated except when the spot is in the area 78.

Such basic units as shown in Fig. 9 may be arranged in tandem, one for each acceptable color in the batch, as shown in Fig. 10. Tiles 1, 1', 1'' and 1''' of different colors are carried on the conveyor 85 past the testing units 3a, 3b, 3c each unit being set to be operated by a particular color. Each testing unit has a bin or chute 86a, 86b and 86c associated with it. If a particular tile such as 1''' fails to actuate any of the test units 3 it passes over the end of the conveyor into a bin 86d.

Fig. 10 shows diagrammatically a sorting device with parts provided to sort particular shades likely to occur in a batch of say, glazed ceramic clay tiles. The tiles 1, 1', 1'' and 1''' are fed through a continuous belt conveyor 85, which moves in a direction indicated by the arrow. Arranged over the belt 85 in such a position as to scan successively any tile moving along the conveyor 85, are a number of sorting devices 3a, 3b and 3c of the sort described above. Beneath each sorting device and slightly to the side thereof are a number of corresponding bins 86a, 86b and 86c. Each of the sorting devices shown schematically as an integrating sphere is arranged to react only to a particular shade of the colors being run through. Tile 1'' has a color to which sorting devices 3a and 3b are not set. Tile 1' having passed sorting device 3a, is not of the color for which 3a is set. If tile 1 is of the color for which sorting device 3a is set, then when tile 1 passes under sorting device 3a, the spot on a cathode-ray tube screen 20 associated with 3a causes a signal that actuates the sorting device that pulls tile 1 sideways over the edge of the conveyor belt 85 and lets it fall into bin 86a. When tile 1' similarly causes sorting device 3b to react, tile 1' is fed into bin 86b and so on for any number of colors. If a tile is defective or so colored that it actuates none of the sorting devices, it will continue on to the end of the conveyor belt where it falls off into a discard bin 86d.

The operation of the embodiment shown in Figs. 1 to 7 is as follows:

Tile 1 is placed across the opening 2 of the integrating or Ulbricht sphere 3. Light from the source 4 passes through the optical system 5 into the integrating sphere 3 and impinges upon the sample 1 through the opening 2. Rays leaving the surface of the object 1 may take a number of paths such as $a$ and $b$. Rays $a$ represent light reflected from the glazed surface of the tile approximately perpendicular to the surface of the tile. Rays $b$ represent reflection of light rays which have penetrated the tile 1 and have been diffused. These rays $b$ then hit the interior walls of the integrating sphere 3 and are again reflected and finally enter the photocells 6, 7 and 8. If it is desired to measure both specular and diffuse reflections, rays $a$ may also be permitted to be reflected from the interior surface of the sphere 3 and into the photocells 6, 7 and 8, which are arranged so as not to view the sample directly in this particular case. If only diffuse reflections are desired, the area of the sphere covered by rays $a$ may be blackened so as to absorb the specularly reflected rays $a$.

The light falling on the photocell 6 through its filter 10 (Fig. 2) produces a signal that is proportional to the brilliance of the sample due to its sensitivity being approximately that of the human eye. When this signal is amplified by amplifier 13 and applied in phase opposition to the vertical deflection plates 16 and 18 of the cathode-ray tube 15 it gives a vertical deflection proportional to the brilliance of the tile. Any variation in the filament current of the light source or darkening of the bulb with age may cause error in this indication. To counteract this a photocell 9 is mounted near the light source 4 (Fig. 1) and its output is applied by lead 9' to one terminal of the differential amplifier 13 (Fig. 2). The output of photocell 6 is connected to the other terminal of this amplifier so that the deflection from a fixed point is proportional to the difference in the outputs of photocells 6 and 9.

The signal from the red sensitive photocell 7 (Fig. 7) when applied to the deflection plates 17 and 19 of the cathode-ray tube 15 through the differential amplifier 14 tends to deflect the spot to the left in the absence of any signal from the blue sensitive photocell 8. The signal from the blue sensitive photocell 8 when similarly applied in the absence of any signal from the red sensitive photocell 7, tends to deflect the spot to the right. When the tile has an intermediate color the spot is deflected to some intermediate point. It is also deflected upwards or downwards as a result of the signals from photocells 6 and 9.

For instance, a bright blue tile causes the spot to be deflected quite far to the right of the line 21 on the scale of Fig. 3 because the blue sensitive photocell 8 produces the stronger signal. Since the tile is bright the spot is deflected above the line 22 (Fig. 3) as more light is reflected from it to be picked up by the photocell 6. This result is to deflect the spot to a position such as 29.

A dark red tile causes the spot to be deflected to the left of line 21 because the red sensitive photocell 7 receives the greater signal. This spot is deflected relatively little above the line 22 because the dark color does not reflect much color for the photocell 6 to pick up. The result of the two deflecting forces moves the spot to a position such as 28', Fig. 3.

Should a tile of a color made up equally of red and blue components and of a medium brightness be placed over the hole 2, the red 7 and the blue 8 sensitive photocells would generate an equal signal while the photocells 6 and 9 would generate a medium signal with the result that the spot would be in the middle horizontally and at an intermediate position vertically.

When such a unit is used for a long time, slow continuous variation in reading takes place due mainly to the blackening of the illuminating source resulting in a lower efficiency. Also variations in line voltage may cause changes in the lamp efficiency resulting in displacement of the spot, particularly in the vertical direction caused by the signal from photocell 6 of Figs. 1 and 2. To compensate for this variation the signal from photocell 6 is applied to the differential amplifier 13 together with the output of the photocell 9 as described above. Any change in the light source 4 then tending to vary the signal from photocell 8 is therefore compensated for by a lower signal from photocell 9.

When the scale of Fig. 3 is used half of the area of the screen is not utilized. This may be avoided by a scale of the sort shown in Fig. 4. When this scale is to be used the vertical deflection plates are so biased that the black level 22 is at the bottom. This gives more room to show varying shades of each color on the curves 30 to 40. Individual shades may be shown, e. g. the reds near line 23, pinks near line 24, whites near the vertical line 21, cyans, (blue-greens) near line 24 and blues near line 23. This arrangement gives more information about a limited range of colors. Further bias may be applied to the vertical deflection plates to place black off the screen when desired.

A particular batch of objects having a particular blue-green color may be studied with the screen of Fig. 4. This color may be made from a mixture of two pigments. Then the area between lines 23' and 24' represents deviation in the color of the resulting mixture, while the areas bounded by the curved lines 28–40 represent permissible brightness and shade variations. All the shades of a particular color will lie along one of the radial lines, the brightness being indicated by the distance from the center. This may be understood from the following:

A particular color is made from a white and a blue pigment on a black base. If the concentration of blue is represented by A, and the concentration of white is represented by B, the coordinates of the color on this particular scale will be $A+jB$, where the $j$ coordinate indicates the brightness component given mostly by the white pigment. Then, if twice as much of the mixture is applied giving a color twice as bright, the coordinates will be $2A+2jB$ or $2(A+jB)$ which represents twice the distance from the origin. Therefore all degrees of brightness of this color will appear along a straight line.

While the distances between the curves 26, 27 and 28 of Fig. 3 and curves 28 to 40 of Fig. 4 are represented as equally spaced they may be spaced logarithmically or exponentially in order to match the characteristics of the eye which has an exponential response according to the Weber-Fechner law.

The color sensitivity of the filters may be so selected as to give more detail as to the color differences in a narrow portion of the spectrum by selecting the filters for the photocells 6, 7 and 8 so as to give a narrower band of sensitivity and make the peak sensitivities of the photocells 6 and 7 come closer together in the spectrum. The interrelation of the photocell sensitivities is represented in Fig. 4.

When it is desired to measure a color with the spectrum distribution shown by curve 41 of Fig. 5, the two filters may be selected to give the photocells 6 and 7 a response in a relatively narrow band about the wavelengths 45 and 48 that are equally spaced from the wavelength of the peak of the characteristic curve of the color under test. However, it is sometimes more desirable to set the sensitivities of these photocells at some points where the slope of the wavelength vs. brightness characteristic of the sample is a maximum, such as at points 46 and 47 in Fig. 5. If, for example, it is desired to measure a color composed of two distinctive peaks such as graph 42 it may be desirable to set the two filters close to the peaks, as at 45 and 48. Then the scale chosen would represent both the relative amounts of two components present, and the overall brightness of the mixture. With such a color the wavelengths 44 and 49 may be selected as being at points of maximum slope of the wavelength distribution curve of the color.

Such an arrangement is useful:

a. In testing a green paint made from a mixture of blue and yellow pigments.

b. In indicating the relative amounts of blue and yellow phosphor and the relative brightness of a cathode-ray tube for television purposes having a "white" screen.

Usually, the filters should be chosen equally spaced from the dominant wave length of the color being tested.

While particular scales and measuring arrangements have been described, it will be evident that any other type of scale, or method of causing a suitable displacement of the spot may be used. For example, three photocells may be arranged to record the X, Y, and Z tri-chromatic coefficients of the I. C. I. system. These may then be combined in any suitable manner such as that recommended by the I. C. I. and described in the "Handbook of Colorimetry" by Hardy. In this case, an I. C. I. scale such as is shown in Fig. 5 may be used. Such a scale is advantageous, for example, when it is desired to know the color of an incandescent lamp at different temperatures. To produce this sort of indication the outputs of the three photocells 6, 7 and 8 are added and the value obtained is used to divide into the readings from each of the photocells 7 and 8. The resulting values are then applied to the vertical deflection plates 16 and 18 and horizontal deflection plates 17 and 19 of the oscilloscope 15. The way this is done is shown in Fig. 7.

The output of photocell 7 is connected across potentiometer 52 of Fig. 7 to provide the X component of the I. C. I. system and the output of photocell 8 of Fig. 1 is connected across the potentiometer 67 of Fig. 7 to provide the Y component and that of photocell 6 of Fig. 2 is connected across potentiometer 74 of Fig. 7 to provide the Z component. The voltage appearing on the grid 54 of triode 55 is then dependent upon the sum of the values of the voltage outputs of the photocells 6, 7 and 8 and represents the sum in the I. C. I. system of color specification. The voltage appearing at the plate 58 of the tube 55 then becomes more negative, the greater this sum. The signal from plate 58 is applied to the grid 62 of the tube 13 to reduce the amplification which the tube 13 provides for the signal from the photocell 7 that is applied to the control grid 65 of tube 13. Similarly the signal from photo tube 8 is acted upon by tube 14 and its amplification is reduced by an increase in the composite signal applied to the grid 61 of tube 14. The action is equivalent to division and the voltage at the plate 63 of tube 13 represents the quantity X divided by X plus Y plus Z, while the voltage at the plate 72 of tube 14 represents the quantity Y divided by X plus Y plus Z, thus giving a reading equivalent to the trichromatic coordinates of the I. C. I. system. The outputs of tubes 13 and 14 are applied to the vertical and horizontal deflection plates respectively of the cathode-ray tube 15 through conventional amplifiers to give a resultant deflection to the cathode-ray beam in accordance with the I. C. I. system. Any other color specification system resulting in two coordinates may similarly be applied to a cathode-ray tube in order to give an instantaneous indication.

While collimated light and an integrating sphere with an opaque sample therein have been described above, other ways of operating the phototubes may be used. For example, a transparent sample may be tested with the device described. Another way of illuminating the sample is shown in Fig. 8. The light from source 4 is obliquely incident on the sample 1. The inside of the case 3' is painted black so that any of the specular light following the paths 4' and 4" is not recorded by the photocells 6', 7' and 8', but the diffuse light following the paths b, b' and b'' is recorded. Conversely the photocells may be placed in the paths of specularly reflected beams 4' and 4" in order to read only specular light. Either collimated, spreading or diffused illumination may be used.

The above described apparatus may be used for manual sorting by taking each piece 1 individually and placing it on the opening 2 of the illuminating device 3 (Fig. 1) and then observing where the spot appears on the cathode-ray tube screen 20. The tested object is then put in an appropriate color or shade classification depending on this position on this screen scale. The acceptable tolerances for each particular color or shade is in the form of an area, which area may be chosen empirically as a regularly shaped area as in Figs. 3 and 4 or it may be determined by experiment by checking the position of a large number of visually acceptable samples and enclosing these in an area, or it may be determined in any other appropriate manner, and may take any other form deemed to be a suitable representation of the desirable color tolerances, such as ellipses, circles, lines, squares, or rhombs. If a number of shades are acceptable, as in the case of tile sorting, for example, a number of areas are used, each of which is given a different classification.

These areas may be used for manual sorting as above, but this, while much more reliable than visual sorting, is still slower than desired. This inspection may be made entirely automatic and speeded up by using any device in which actuation is dependent upon the position of the spot. For example, in one form of the present invention, these different areas are colored on the face of the tube 15 with different transparent colors, which are painted on or held over the face of the tube as a mask. The light emitted from the face of the tube then assumes different colors depending on the position of the spot. A number of photocells, each sensitive to only one of these different colors, is used, each photocell actuating an appropriate sorting device.

What is claimed is:

1. A photometric color indicator comprising a cathode ray tube having deflecting means for indicating $x$ and $y$ coordinates on a fluorescent screen thereof, three photoelectric responsive devices respectively differently color-selective, one of said devices having the color-sensitive characteristic of the human eye, a first amplifier connecting one of the said devices to said deflecting means for indicating one of said coordinates, a second amplifier connecting a second of said devices to said deflecting means for indicating another of said coordinates, a third of said devices being connected differentially to oppose the amplification of one of the other of said devices.

2. A photometric color indicator comprising a cathode-ray tube having deflecting means for indicating $x$ and $y$ coordinates on a fluorescent screen thereof, three photoelectric responsive devices respectively differently color-selective, one of the said devices having the color-sensitive characteristic of the human eye, the one of said devices having the characteristic of the human eye being connected to said deflecting means for indicating a $y$-coordinate, the other two of said devices being connected in opposition and to said deflecting means for indicating the $x$-coordinate.

3. A photometric color indicator comprising a cathode ray tube having deflecting means for indicating $x$ and $y$ coordinates on a fluorescent screen thereof, three photoelectric responsive devices respectively differently color-selective, one of said devices having the color-sensitive characteristic of the human eye, a first amplifier connecting one of the said devices to said deflecting means for indicating one of said coordinates, a second amplifier connecting a second of said devices to said deflecting means for indicating another of said coordinates, the third of said devices being connected to be combined with the output of each of the other of said devices to oppose the amplification of each said amplifier.

CARL BERKLEY.

REFERENCES CITED

The following references are of record in the file of this patent:

UNITED STATES PATENTS

| Number | Name | Date |
| --- | --- | --- |
| 1,379,172 | Crites | May 24, 1921 |
| 2,008,410 | Wilson | July 16, 1935 |
| 2,228,560 | Cox | Jan. 14, 1941 |
| 2,244,826 | Cox | June 10, 1941 |
| 2,388,727 | Dench | Nov. 13, 1945 |